US 11,182,947 B1

(12) United States Patent
Wu et al.

(10) Patent No.: US 11,182,947 B1
(45) Date of Patent: Nov. 23, 2021

(54) SYSTEMS AND METHODS FOR RENDERING AVATAR USING UNCORRELATED CODEC PORTIONS IN CODEC

(71) Applicant: Facebook Technologies, LLC, Menlo Park, CA (US)

(72) Inventors: Chenglei Wu, Pittsburgh, PA (US); Jason Saragih, Pittsburgh, PA (US); Tomas Simon Kreuz, Pittsburgh, PA (US); Takaaki Shiratori, Pittsburgh, PA (US)

(73) Assignee: Facebook Technologies, LLC., Menlo Park, CA (US)

(*) Notice: Subject to any disclaimer, the term of this patent is extended or adjusted under 35 U.S.C. 154(b) by 35 days.

(21) Appl. No.: 16/852,226

(22) Filed: Apr. 17, 2020

(51) Int. Cl.
*G06T 13/40* (2011.01)
*G06N 20/00* (2019.01)
*G06T 17/20* (2006.01)

(52) U.S. Cl.
CPC .......... *G06T 13/40* (2013.01); *G06N 20/00* (2019.01); *G06T 17/205* (2013.01)

(58) Field of Classification Search
CPC ........ G06T 13/40; G06T 17/205; G06N 20/00
See application file for complete search history.

(56) References Cited

U.S. PATENT DOCUMENTS

| | | | |
|---|---|---|---|
| 10,679,046 B1* | 6/2020 | Black | G06T 17/00 |
| 2018/0181802 A1* | 6/2018 | Chen | G06N 3/0454 |
| 2020/0193591 A1* | 6/2020 | Kamiyama | G06T 7/75 |
| 2020/0334828 A1* | 10/2020 | Oztireli | G06T 7/75 |
| 2021/0166088 A1* | 6/2021 | Chen | G06K 9/00281 |

* cited by examiner

Primary Examiner — Maurice L. McDowell, Jr.
(74) Attorney, Agent, or Firm — Baker Botts L.L.P.

(57) ABSTRACT

In one embodiment, a system may access a codec that encodes an appearance associated with a subject and comprise codec portions that respectively correspond to body parts of the subject. The system may generate a training codec that comprises a first subset of the codec portions (a first set of body parts) and a modified second subset of the codec portions (muted body parts). The system may decode the training codec using a machine-learning model to generate a mesh of the subject. The system may transform the mesh of the subject based on a predetermined pose. The system may update the machine-learning model based on a comparison between the transformed mesh and a target mesh of the subject having the predetermined pose. The system in the present application can train a machine-learning model to render an avatar with a pose using uncorrelated codec portions corresponding to different body parts.

20 Claims, 10 Drawing Sheets

SYSTEMS AND METHODS FOR RENDERING AVATAR USING UNCORRELATED CODEC PORTIONS IN CODEC

TECHNICAL FIELD

This disclosure generally relates to avatar rendering, and more specifically method, apparatus, and system for rendering an avatar with a pose based on uncorrelated codec portions representing different body parts in a codec of a user.

BACKGROUND

An avatar-rendering system usually comprises an encoder to generate a codec of a user based on input images and a decoder trained to decode the codec of the user to render a corresponding mesh and texture for rendering an avatar of the user. However, it is impractical to have a training data set that includes every possible combination of body poses, especially the training data is generated based on the input images of the user. Due to the limitations of the training data set which does not comprise every body pose, the decoder could overfit to the training data set and correlate the body parts which should not be correlated and renders an avatar of the user with an incorrect pose.

SUMMARY OF PARTICULAR EMBODIMENTS

To address the foregoing problems, disclosed are methods, apparatuses, and a system, to render an avatar of a user with a pose using uncorrelated codec portions, which represent different body parts, in a codec of the user, such that the avatar can be rendered/modified with any poses without excessive training codecs or oversized neural networks. The present disclosure provides a method to train a machine-learning model to uncorrelate each codec portion, which corresponds to a specific body part, in the codec of the user, so that the trained machine-learning model can be used to render an avatar with any combination of potential poses. In each of training iteration, the machine-learning model may be trained by a training codec which randomly selects a subset of the body parts to train. Until every body part of the user has been trained in at least one training codec, the machine-learning model can recognize that each body part is uncorrelated with another body part. Therefore, the trained machine-learning model can be used to generate an avatar with a predetermined pose using uncorrelated codec portions of the codec for the user.

The embodiments disclosed herein are only examples, and the scope of this disclosure is not limited to them. Particular embodiments may include all, some, or none of the components, elements, features, functions, operations, or steps of the embodiments disclosed herein. According to one embodiment of a method, the method comprises accessing a codec that encodes an appearance associated with a subject. The codec comprises codec portions that respectively correspond to body parts of the subject. The method further comprises selecting a first subset of the codec portions corresponding to a first subset of the body parts and a second subset of the codec portions corresponding to a second subset of the body parts. The method yet further comprises modifying the second subset of the codec portions. The method further comprises generating a training codec that comprises the first subset of the codec portions and the modified second subset of the codec portions. The method further comprises decoding the training codec using a machine-learning model to generate a mesh of the subject. The method comprises transforming the mesh of the subject based on a predetermined pose. The method yet further comprises updating the machine-learning model based on a comparison between the transformed mesh and a target mesh of the subject having the predetermined pose.

In one embodiment, modifying the second subset of the codec portions comprises replacing the second subset of the codec portions with the first subset of the codec portions.

In one embodiment, modifying the second subset of the codec portions comprises introducing noise to the second subset of the codec portions.

In one embodiment, the comparison is generated by comparing the first subset of the body parts in the transformed mesh with corresponding body parts in the target mesh, generating a geometry $\hat{G}$ of the transformed mesh based on the comparison, and calculating a loss based on the geometry $\hat{G}$ and a geometry $G$ of the corresponding body parts in the target mesh.

In one embodiment, transforming the mesh of the subject based on the predetermined pose comprises applying a template mesh of the subject which includes appearance information of the subject to the mesh, and deforming the applied mesh based on the predetermined pose.

In one embodiment, the method further comprises accessing one or more view codes of the subject that represent one or more viewpoints for the subject, decoding the codec and the one or more view codes of the subject to generate a texture of the subject based on the one or more viewpoints, and updating the machine-learning model based on a comparison between the texture of the subject and a target texture of the subject.

In one embodiment, the method further comprises accessing one or more batches of codecs of the subject, selecting a first set of the codecs corresponding to a third subset of the body parts and a second set of the codecs corresponding to a fourth subset of the body parts, copying the first set of the codecs to replace a corresponding set of the codecs in each batch of the one or more batches, generating a set of training codecs that comprises the first set of the codecs for the third subset of the body parts in each batch, decoding the set of the training codecs using the machine-learning model to generate a second mesh of the subject, transforming the second mesh of the subject based on a second predetermined pose, and updating the machine-learning model based on a second comparison between the transformed second mesh and a second target mesh of the subject having the second predetermined pose.

In one embodiment, each codec has predetermined regions that map to different body parts of the subject.

In one embodiment, the second comparison is generated by comparing the third subset of the body parts in the transformed second mesh with corresponding body parts in the second target mesh, generating a second geometry $\hat{G}$ of the transformed second mesh based on the comparison, and calculating a second loss based on the second geometry $\hat{G}$ and a geometry $G$ of the corresponding the body parts in the second target mesh.

In one embodiment, the machine-learning model is configured to generate images for television monitors, cinema screens, computer monitors, mobile phones, or tablets.

Embodiments according to the invention are in particular disclosed in the attached claims directed to a method, a storage medium, a system and a computer program product, wherein any feature mentioned in one claim category, e.g. method, can be claimed in another claim category, e.g.

system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the present disclosure and their embodiments may provide solutions to these or other challenges. There are, proposed herein, various embodiments which address one or more of the issues disclosed herein. The methods disclosed in the present disclosure may provide a method for training a machine-learning model to recognize that each body part of the user is not correlated, such that the trained machine-learning model can render an avatar with any poses based on these uncorrelated body parts. Particular embodiments disclosed in the present application provide an autoencoder generating training codecs for training the machine-learning model. Each training codec comprises a subset of body parts which is randomly selected to be trained, and therefore, a training codec set comprising training codecs could train every body part of the user over multiple training iterations. Therefore, the trained machine-learning model disclosed in the present application could consider that each body part of the user is uncorrelated and render an avatar with any possible poses.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains drawings executed in color. Copies of this patent or patent application publication with color drawing(s) will be provided by the Office upon request and payment of the necessary fee.

The accompanying drawing figures incorporated in and forming a part of this specification illustrate several aspects of the disclosure, and together with the description serve to explain the principles of the disclosure.

DESCRIPTION OF EXAMPLE EMBODIMENTS

Figure 1:
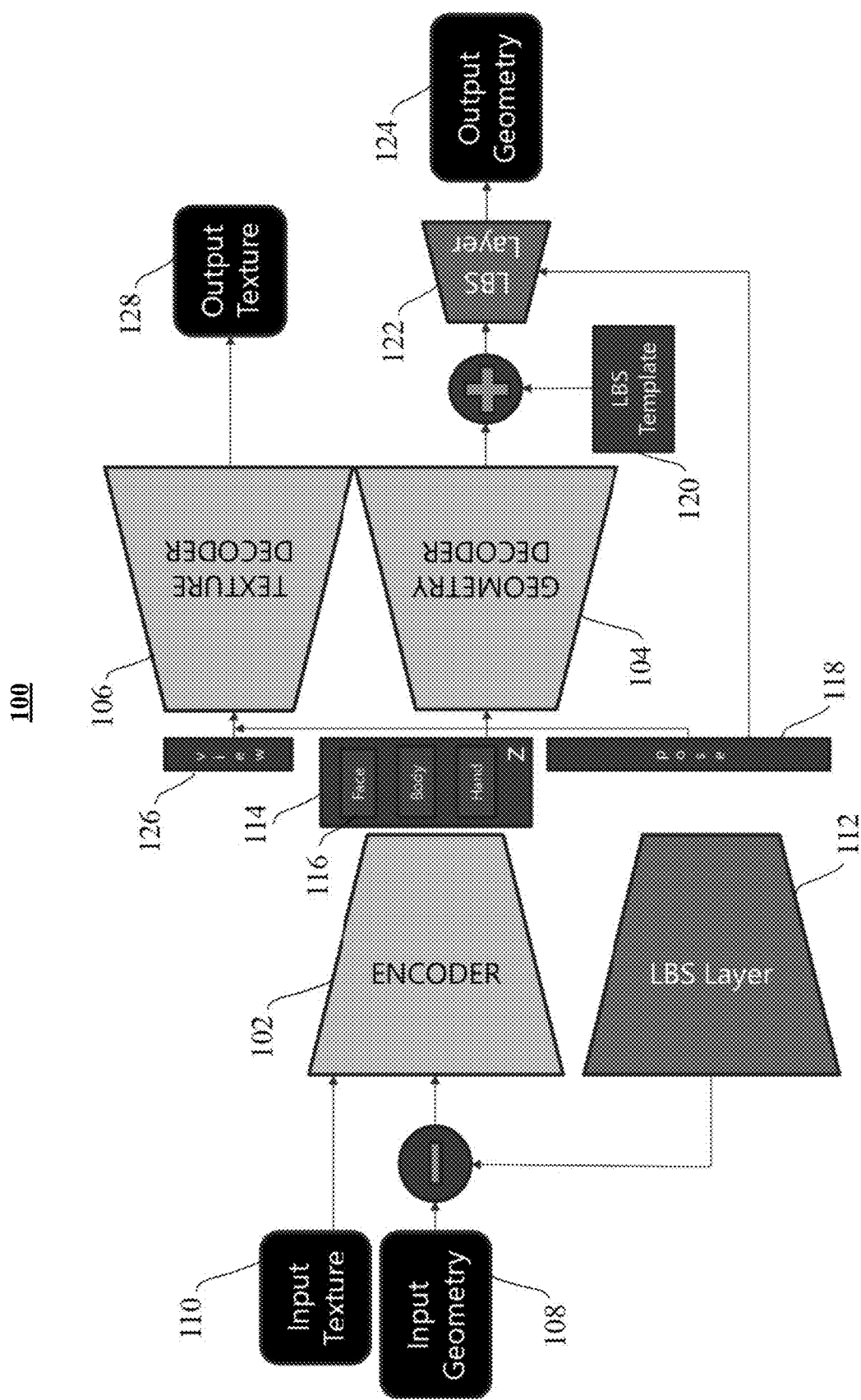
FIG. 1 illustrates an example diagram of an avatar-rendering system architecture.

Current avatar rendering systems face several challenges to render an avatar with a pose due to the limitations of training data set which only comprises a certain combination of body poses. The decoder may overfit to the training data set and correlate the codec portions which represent different body parts of the user that should not be correlated. For example, correlating body parts that should not be correlated may cause unexpected results, e.g., a movement of the left hand could unnecessarily affect an orientation of the head.

In order to avoid overfitting and excessive training codecs, embodiments described herein provide a method to train a machine-learning model to uncorrelate each codec portion which corresponds to a specific body part in a codec of the user, so that the trained machine-learning model can be used to render an avatar with any of potential poses. In each training iteration, the machine-learning model may be trained by a training codec, which randomly selects a subset of the body parts (e.g., the head and the left arm of the user) to be trained and introduces noise to the rest of the body parts, such that the machine-learning model could only render the selected body parts of the user in one training iteration. After several training iterations until every body part has been trained in at least one training iteration, the machine-learning model can recognize that a certain portion of body parts is uncorrelated with another portion of body parts. Therefore, the trained machine-learning model can be used to generate an avatar with a predetermined pose by using unrelated codec portions corresponding to different body parts in the codec.

Furthermore, the machine-learning model disclosed in the present disclosure may utilize a linear blend skinning (LBS) layer to lessen the inputs for the encoder and furthermore to lessen the outputs from the decoder as well. With the LBS layer, the inputs for the encoder may be a skeleton of the user (e.g., a basic geometry having keypoints identified from the user's body) which illustrates a pose of the user to be encoded into a codec of the user, and likewise, the decoder may decode the codec of the user to output a skeleton of the user with a corresponding pose. The skeleton of the user rendered by the decoder may then be processed with a LBS template to add details/appearance information to the skeleton of the user based on a predetermined pose. In addition, an additional LBS layer may also be applied to this machine-learning model disclosed in the present disclosure to deform the primary mesh of the user (e.g., the skeleton of the user with appearance information) to output a final mesh/geometry.

The term "avatar" may, in some examples, refer to a rendered image of a subject, such as a rendered image of a subject that is animated and interactive within the context of a VR/AR presentation. In some examples, a "subject" may comprise a human face. It should be appreciated, however, that the term "subject" as used herein may encompass any portion or entirety of a human or other animal. Also, the term "subject" as used herein may encompass clothing, plants, and other objects.

As discussed above, particular embodiments may use machine learning to generate the desired outputs for the user with any poses which does not require large neural networks and could avoid overfitting to training data. Provided below is an overview of particular embodiments of a machine-learning architecture and training procedures to support rendering for displays.

FIG. 1 illustrates an example diagram of an avatar-rendering system architecture, in accordance with certain embodiments. The avatar-rendering system 100 comprises an encoder 102, a geometry decoder 104, and a texture decoder 106 for rendering an avatar of a user via a machine-learning model. The encoder 102 receives an input geometry 108 and an input texture 110 of the user to encode a codec 114 of the user. In particular embodiments, the input geometry 108 and the input texture 110 of the user may be generated based on one or more images captured by one or more cameras. For example, the user may wear a head-mounted display (HMD) which comprises one or more cameras to capture one or more images of the user. The one or more images may provide geometry information and view-dependent texture information to generate the input geometry 108 (e.g., an input mesh of the user) and the input texture 110 of the user.

In particular embodiments, a linear blend skinning (LBS) layer 112 may be included before feeding the input geometry 108 into the encoder 102 to deform the input geometry 108. For example, the LBS layer 112 may simplify the input geometry 108 into a skeleton of the user which comprises only the joints/keypoints of the user (e.g., an elbow or a knee of the user) to represent a pose of the user. The LBS layer 112 provides the deformed input geometry 108 to the encoder 102 to be encoded into the codec 114. The codec 114 may comprise multiple codec portions/sections 116 which correspond to different body parts respectively, e.g., head, body, and hand, etc. In particular embodiments, the encoder 102 may be an autoencoder to generate training codecs for training the machine-learning model. For each training iteration, a subset of the codec portions 116 in the codec 114 would be randomly selected to generate a training codec to train the machine-learning model. For example, the codec portions of the head and the body are selected to generate a first training codec for the first training iteration, and the codec portions of the body and the hand are selected to generate a second training codec for the second training iteration, and so on until each codec portion, e.g., each body part, of the codec has been included in the training codecs and trained for at least one time. The entire training process for the machine-learning model may be completed when each coded portion has been trained in at least one training iteration. In other words, a training codec set is prepared when the training codec set comprises the training codecs covering every body part of the user in at least one training codec. Detailed operations and actions of the training codec may be further described in FIG. 2.

The geometry decoder 104 receives the training codec and a predetermined pose 118 of the user to output a basic geometry of the user, e.g., a skeleton of the user. In particular embodiments, the predetermined pose 118 corresponds to a pose of the input geometry 108. In particular embodiments, a LBS template 120 may then be added to deform the skeleton of the user to provide appearance information of the user for generating a first geometry of the user. For example, the LBS template 120 may comprise an appearance template of the user which is generated based on the input images of the user. Furthermore, the first geometry may then be processed by a second LBS layer 122 to deform the first geometry of the user based on the predetermined pose 118 to generate an output geometry 124.

The machine-learning model may be trained by comparing the output geometry 124 with the input geometry 108. A loss may be calculated based on the comparison between the input geometry 108 and the output geometry 124 and then used to update the machine-learning model. In particular embodiments, the comparison between the input geometry 108 and the output geometry 124 only focuses on the selected body parts. Detailed operations and actions of a loss calculation may be further described in FIGS. 3A-3C.

Furthermore, the texture decoder 106 decodes the codec 114 and a view code 126 to generate an output texture 128 of the user from at least one viewpoint. For example, the output texture 128 of the user may be generated based on multiple view-conditional textures from different viewpoints derived from the view code 126. In particular embodiments, a predetermined pose 118 of the user may also be fed into the texture decoder 106 to facilitate the generation of the output texture 128. For example, the output texture 128 may be an unwrapped texture image of the user and then be deformed/wrapped based on the predetermined pose 118.

Based on the output geometry 124 and the output texture 128, the machine-learning model may render an avatar of the user with a pose which corresponds to the pose of the input geometry 108. In particular embodiments, the avatar-rendering system 100 includes one or more coordinate systems to estimate a global body pose of the user 110 relative to a global map for rendering an avatar. For example, the global body pose may comprise a pose of the user's head relative to the user's body in a global environment. Furthermore, the avatar-rendering system 100 may also render an avatar of the user in a local environment. For example, a local body pose may comprise a pose of the user's head relative to the user's body in a local environment, e.g., an indoor space.

This disclosure contemplates any suitable network to connect each element in the avatar-rendering system or to connect the avatar-rendering system with other systems. As an example and not by way of limitation, one or more portions of network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network may include one or more networks.

Figure 2:
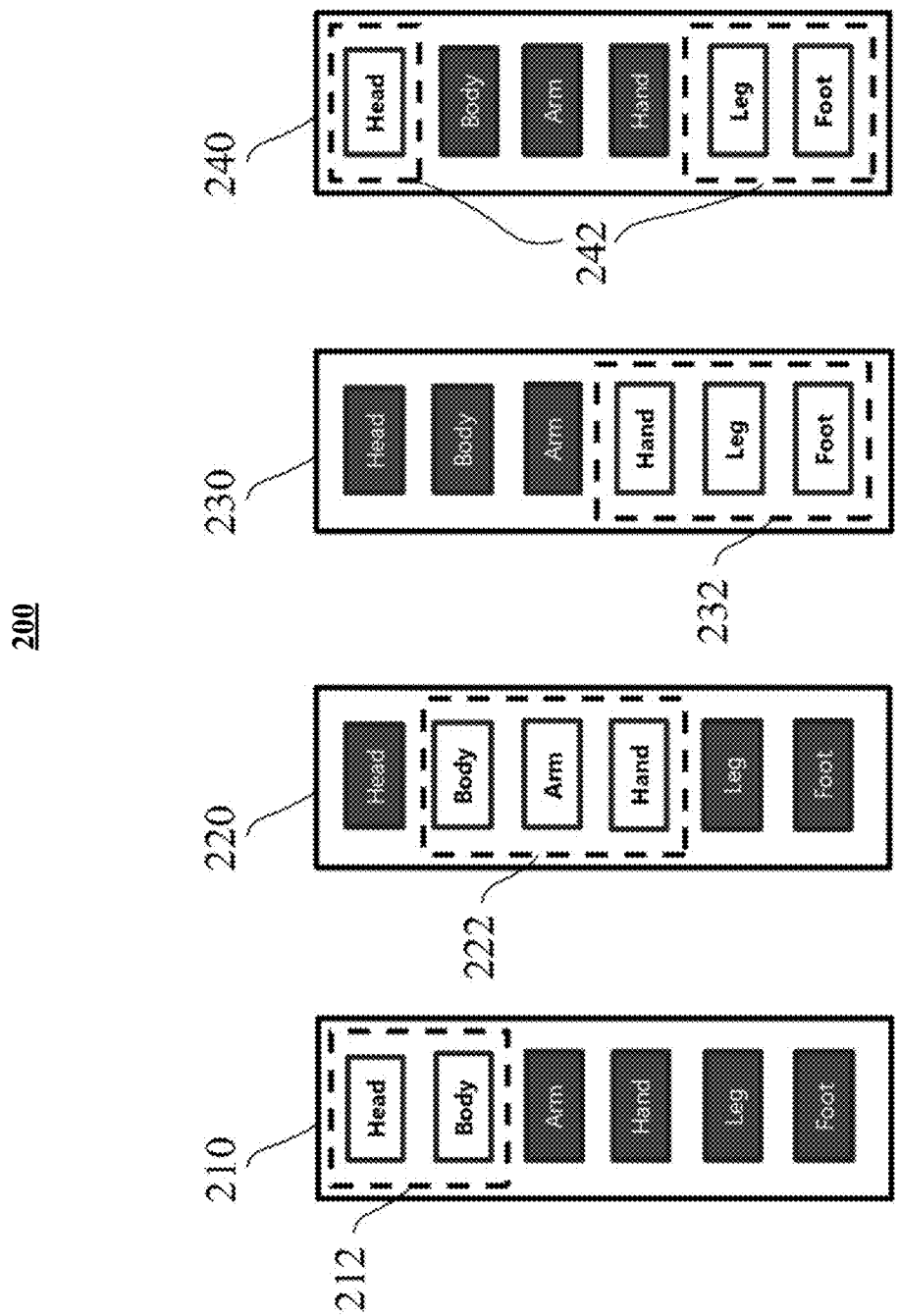
FIG. 2 illustrates an example embodiment of a training codec set including multiple training codecs.

FIG. 2 illustrates an example embodiment of a training codec set, in accordance with certain embodiments. A training codec set 200 may comprise, but not be limited to, multiple training codecs 210, 220, 230, 240 generated by the encoder for training the machine-learning model. In particular embodiments, the training codecs 210, 220, 230, 240 may be generated by the encoder based on a codec of a user which encodes appearance information associated with the user. For example, the codec of the user may be generated based on depth measurements of input images of the user and include multiple codec portions representing different body parts. Furthermore, the codec of the user may be an established codec of the user retrieved from a storage, e.g., a cloud or a memory implemented in a head-mounted display (HMD).

Each of the training codecs 210, 220, 230, 240 may select training codec portions which correspond to different body parts of the user to train a certain portion of body parts. For example, the training codec 210 comprises five codec portions representing head, body, arm, hand, leg, and foot respectively and selects the codec portions of the head and the body of the user to train. In particular embodiments, the codec portions may be generated based on keypoints determined from the user. For example, the number of the codec portions may be determined based on the number of the joints in the user's body, such that each body part represented by its corresponding codec portion can be deformed relative to the other body part based on a movable junction to render a pose of the user. The encoder may randomly select a subset of the codec portions to generate a training codec. For example, a first subset 212 (e.g., head and body) of the codec portions in the training codec 210 may be selected for a first training iteration, and the rest codec portions (e.g., arm, hand, leg, and foot) would be muted in this training codec 210. In particular embodiments, the encoder may copy the vectors in the selected codec portions (e.g., the first subset 212 of the codec portions) and replace the vectors in the rest codec portions with the copied vectors from the selected codec portions to mute the unselected codec portions. In particular embodiments, the encoder may introduce noise to the unselected codec portions (e.g., the codec portions which are not going to be trained in this training iteration or the codec portions which are not included in the first subset 212 of the codec portions) to mute the unselected codec portions. Therefore, when the decoder decodes the training codec 210 to output a mesh of the user, the decoder only generates a mesh of the body parts corresponding to the first subset 212 of the codec portions. By comparing the body parts in the generated mesh with their corresponding body parts in the input mesh, the machine-learning model is updated by a loss calculated based on the comparison.

Furthermore, the encoder may generate more training codecs for training the machine-learning model in a similar manner. The encoder randomly selects a second subset 222 of the codec portions (e.g., body, arm and hand) in the training codec 220 for training and mutes the rest codec portions (e.g., head, leg and foot) in the training codec 220. The decoder decodes the training codec 220 and generates a mesh of the body parts corresponding to the second subset 222 of the codec portions. Likewise, the encoder randomly selects a third subset 232 of the codec portions (e.g., hand, leg and foot) in the training codec 230 for training and mutes the rest codec portions (e.g., head, body and arm) in the training codec 230. Furthermore, the encoder encodes the training codec 240 by selecting a fourth subset 242 of the codec portions (e.g., head, leg and foot) and muting the rest codec portions (e.g., body, arm and hand) in the training codec 240. The encoder would generate enough training codecs to ensure that every body part of the user is randomly trained in at least one training codec and is trained with different body parts. In other words, after a sufficient training, the machine-learning model may recognize that each of the body parts of the user is not correlated since every body part has been trained with different body parts in multiple training iterations.

Figure 3A:
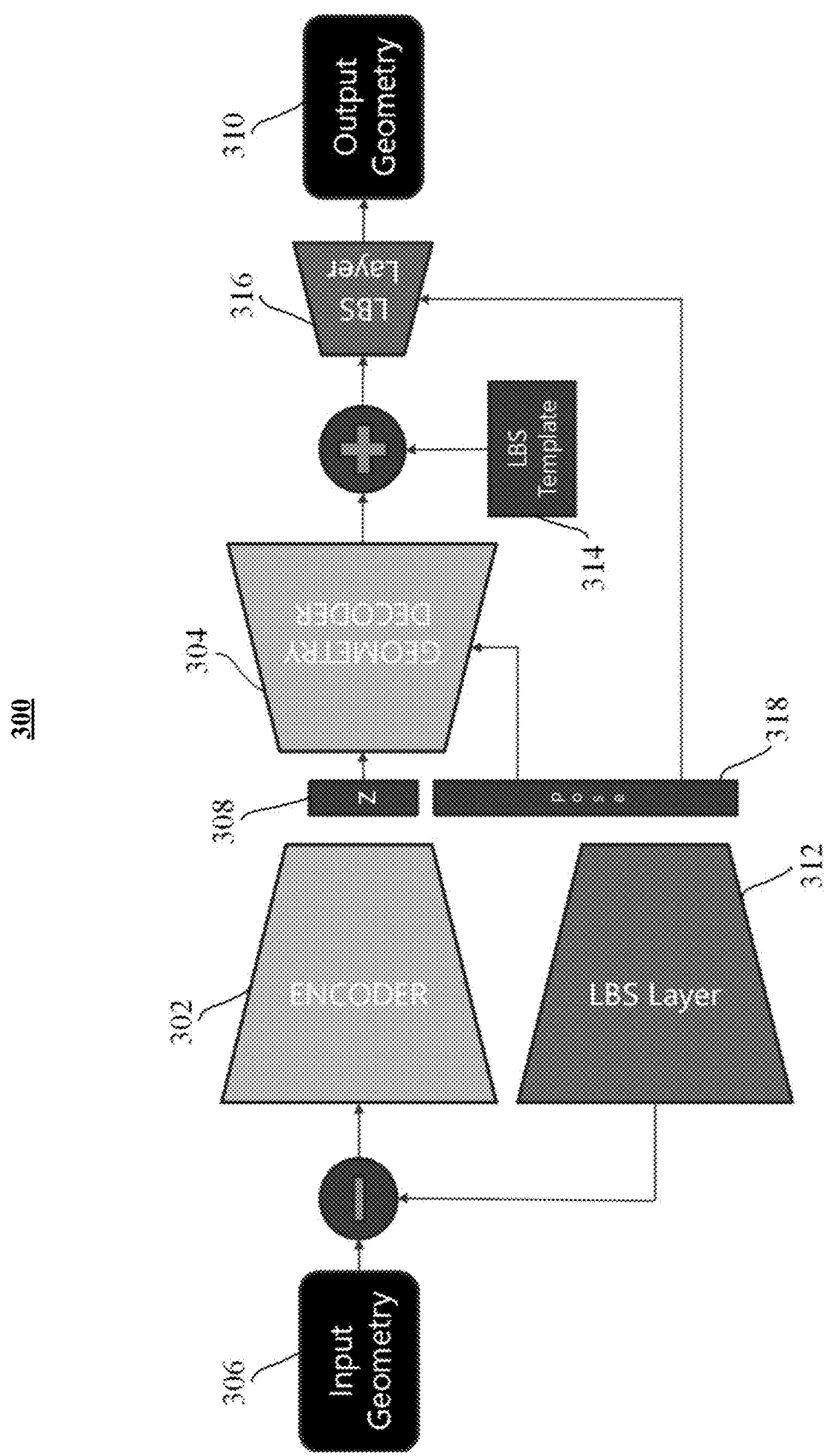
FIGS. 3A-3C illustrate an example diagram of training a machine-learning model for generating output geometry.
Figure 3B:
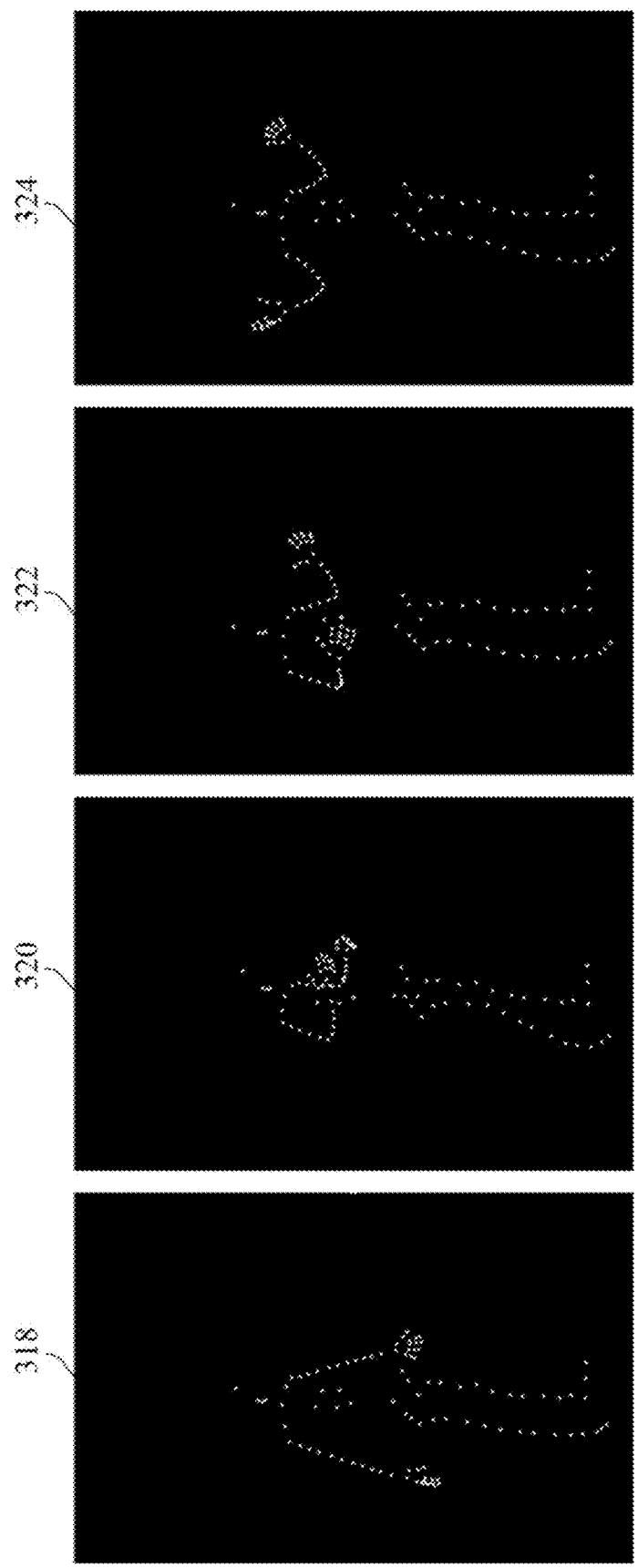
Figure 3C:
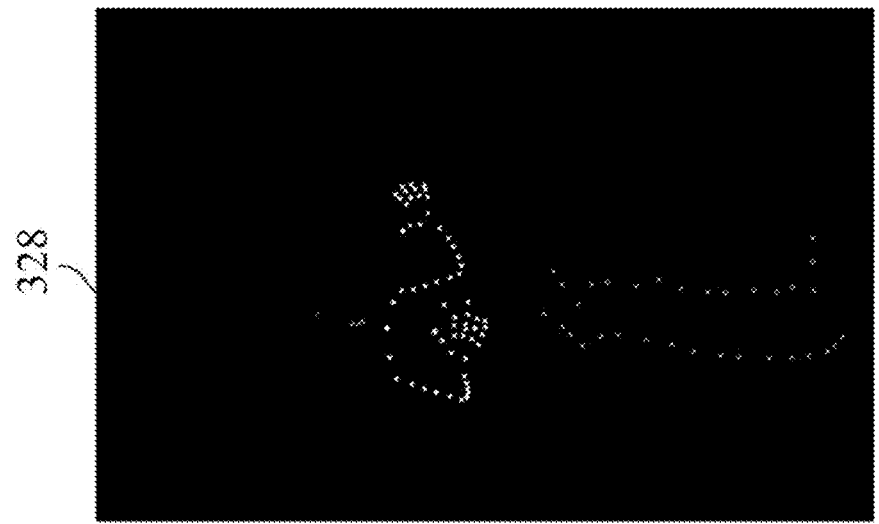
Figure 3C:
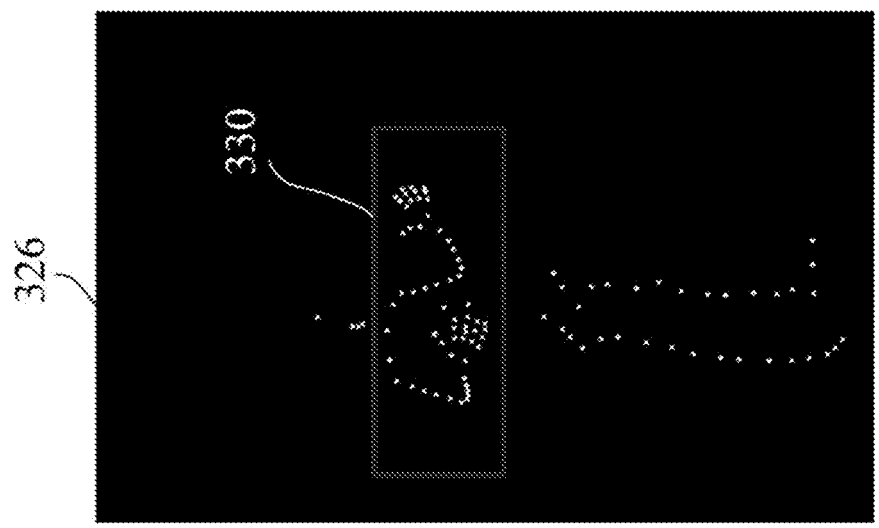

FIGS. 3A-3C illustrate an example embodiment of training a machine-learning model for an output geometry with a pose, in accordance with certain embodiments. In FIG. 3A, a machine-learning model 300 is used to generate an output geometry 310 of the user with a pose. The machine-learning model 300 comprises an encoder 302 to encode an input geometry 306 of the user to generate a training codec set 308 and a geometry decoder 304 to decode training codecs in the training codec set 308 to generate output geometries 310 of different body parts for training the machine-learning model 300. In particular embodiments, the machine-learning model 300 may further comprise an LBS layer 312 to deform the input geometry 306, which only represents a pose of the user using identified features/keypoints of the user, before feeding into the encoder 302. Example embodiments of the deformed input geometry are illustrated in FIG. 3B. FIG. 3B illustrates that several deformed input geometries 318, 320, 322, 324 of the user generated by the LBS layer 312. In particular embodiments, the input geometry 306 may be a coarse mesh representation of the user's features, which features may be computed based on depth measurements of the user. For example, a template mesh may be distorted or modified based on the depth measurements of the features of the user, so that the distorted input mesh may reflect a contour of the user, e.g., the input geometry 306.

In each training iteration, the geometry decoder 304 decodes one training codec, which selects a random portion of body parts of the user to train, from the training codec set 308 and outputs an output geometry 310 of the selected portion of the body parts. In particular embodiments, a LBS template 314 may be added to a basic geometry, e.g., a skeleton of the user, outputted from the geometry decoder 304. The LBS template 314 provides appearance information of the user, e.g., appearance geometry of the user, to generate a first mesh of the user. In particular embodiments, the first mesh of the user may then be deformed by a second LBS layer 316 based on a predetermined pose 318 to generate/finalize the output geometry 310.

Furthermore, the machine-learning model 300 is updated by comparing the selected portion of the body parts in the output geometry 310 with the corresponding body parts in the input geometry 306. An example embodiment of a comparison between the input geometry 306 and the output geometry 310 is disclosed in FIG. 3C. In FIG. 3C, an input geometry 326 is a deformed mesh of the user representing a pose of the user, and an output geometry 328 of the user is a deformed mesh of the selected body parts of the user. For example, if the training codec selects body, arms, and hands of the user to train, the geometry decoder 304 would decode this training codec to output the deformed mesh 328 of the selected body parts (i.e., body, arms, and hands) of the user. Furthermore, a geometry G of corresponding body parts 330, which are the selected body parts in the training codec, in the input geometry 326 is calculated, and a geometry $\hat{G}$ of the body parts in the deformed mesh 328 is also calculated. By comparing the geometry G of the corresponding body parts 330 in the input geometry 326 with the geometry $\hat{G}$ of the body parts in the deformed mesh 328, a loss/difference between the body parts in the input mesh 326 and the deformed mesh 328 can be determined. The machine-learning model is then updated by the loss of the selected body parts between the input mesh 326 and the deformed mesh 328.

Via multiple training iterations with different selected body parts in the training codecs, the machine-learning model 300 may recognize that each of the body parts of the user is not correlated with each other. For example, the head of the user could be trained several times in different training codecs, e.g., the first training codec selects the head, the body and the hand of the user to train, the second training codec selects the head, the leg and the foot of the user to train, and the third training codec selects the head, the arm and the foot of the user to train. Therefore, since the head of the user has been trained with different body parts in different training codecs, the machine-learning model 300 may consider that the head of the user is not correlated with at least a portion of the body parts, so that a pose/movement of the head in a rendered avatar is not affected by the pose/movement of other body parts of the user, e.g., a hand's pose would not affect a head's pose necessarily.

Figure 4:
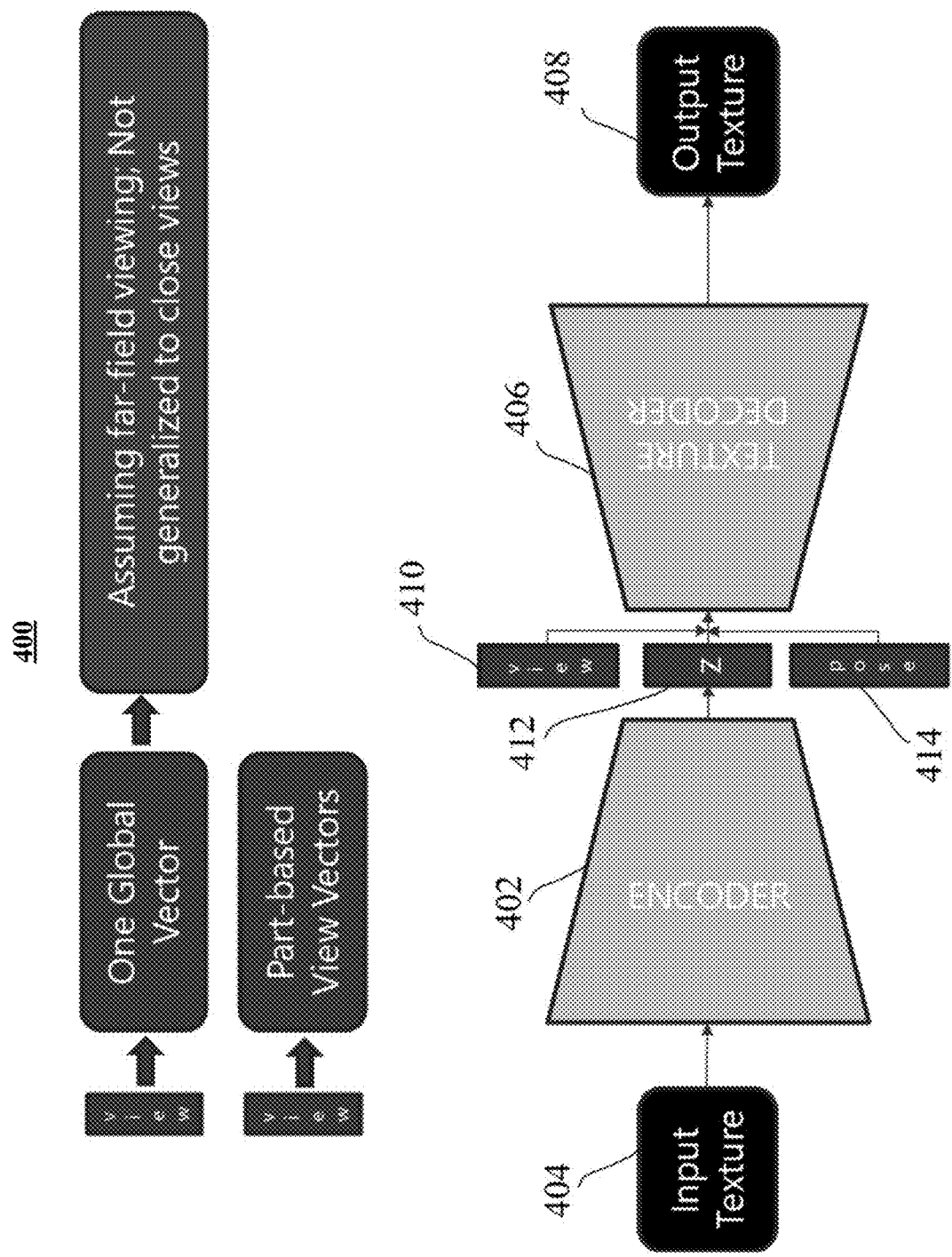
FIG. 4 illustrates an example diagram of training a machine-learning model for generating output texture.

FIG. 4 illustrates an example embodiment of training a machine-learning model for an output texture globally and locally, in accordance with certain embodiments. A machine-learning model 400 is used to generate an output texture 408 of the user based on a training codec from at least one viewpoint. For example, the output texture 408 of the user may be generated based on multiple view-conditional textures from different viewpoints. The machine-learning model 400 comprises an encoder 402 to encode an input texture 404 of the user to generate a training codec set 412, and a texture decoder 406 to decode training codecs in the training codec set 412 to generate output textures 408 of different body parts from multiple viewpoints derived from view codes 410. In particular embodiments, the output texture 408 may be generated via a similar method disclosed in FIGS. 1-3. In particular embodiments, the output texture 408 may be generated with a predetermined pose 414, which predetermined pose 414 corresponds to a pose in the input texture 404. The machine-learning model 400 may then be updated based on a comparison between the input texture 404 and the output texture 408. In particular embodiments, the comparison is based on a loss calculated by comparing an output texture of the selected body parts in the training codec and an input texture of corresponding body parts.

Furthermore, the view code 410 may provide a viewpoint locally or globally. In particular embodiments, the view code 410 may be a global vector to provide a viewpoint based on a location in a global map. The view code 410 may be generated based on a far-field image, e.g., the viewpoint generated based on the global vector may be a far-field viewing. In particular embodiments, the view code 410 may be a part-based view vectors to provide a conditional viewpoint in a local environment.

Based on an output geometry generated based on the methods disclosed in FIGS. 1-3 and the output texture 408 of the user, the machine-learning model may render an avatar of the user. Embodiments of the machine-learning model can be trained and applied to various imagery tasks for computational displays by changing the input and output of the network. In particular embodiments, the machine-learning model may be an autoencoder, a generative adversarial network, or any other suitable machine-learning architecture. Embodiments of the machine-learning model may be configured to generate images for wide field of view (FOV) displays, holographic displays, light field displays, and any other suitable displays.

Figure 5A:
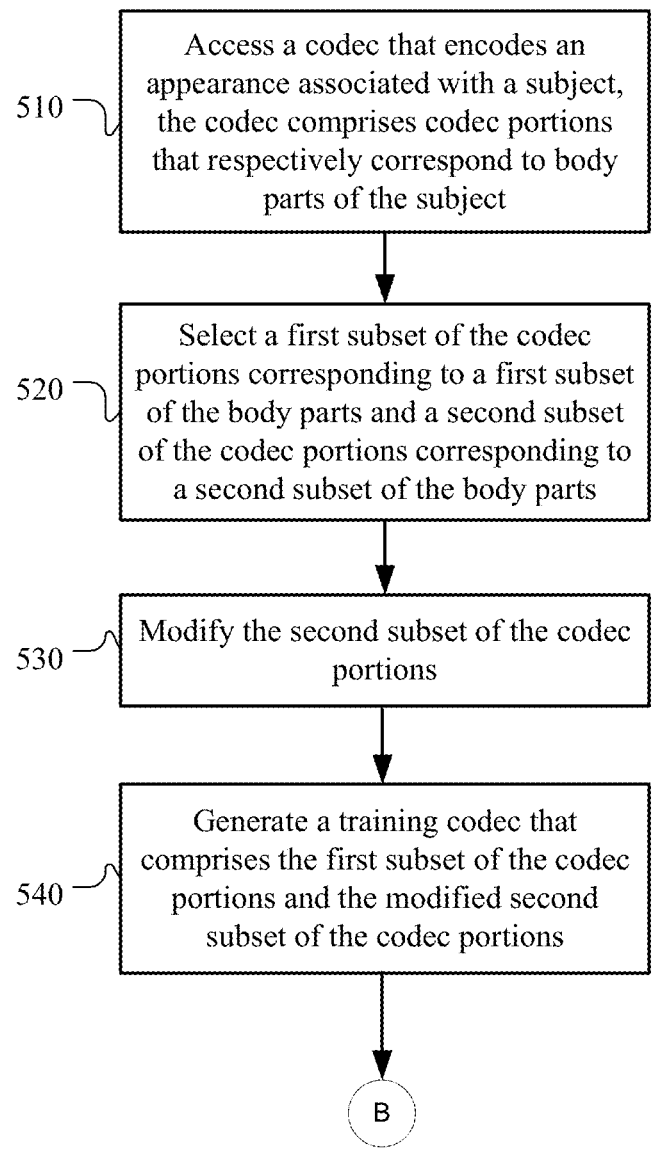
FIGS. 5A-5C illustrate an example embodiment of training a machine-learning model for rendering an avatar of a user with a predetermined pose.
Figure 5B:
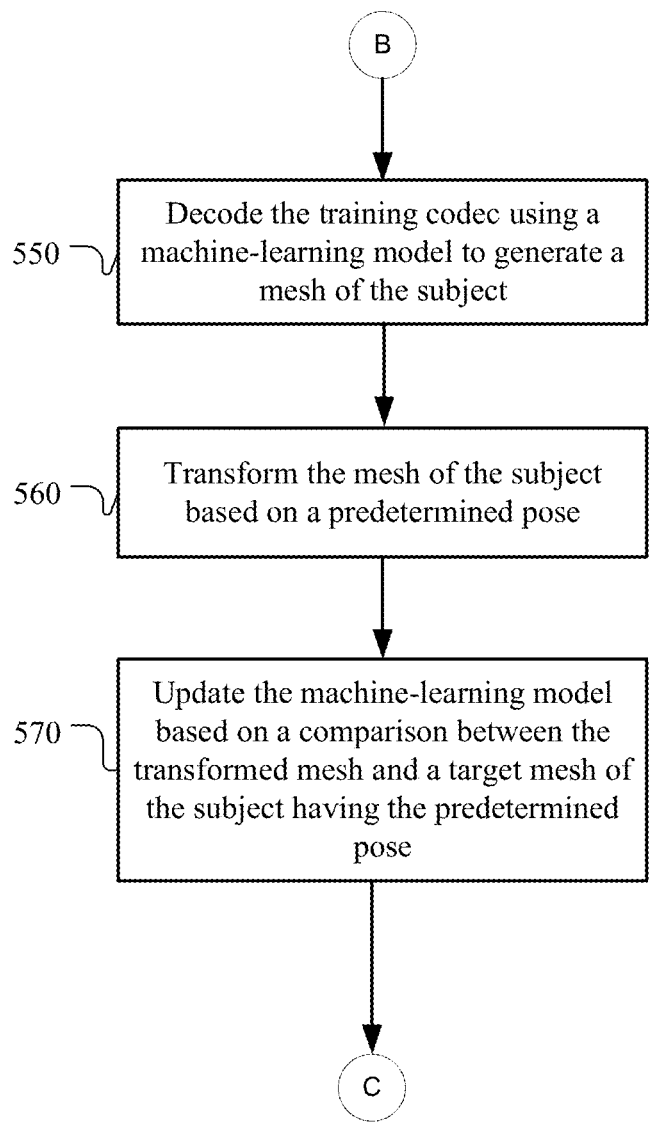
Figure 5C:
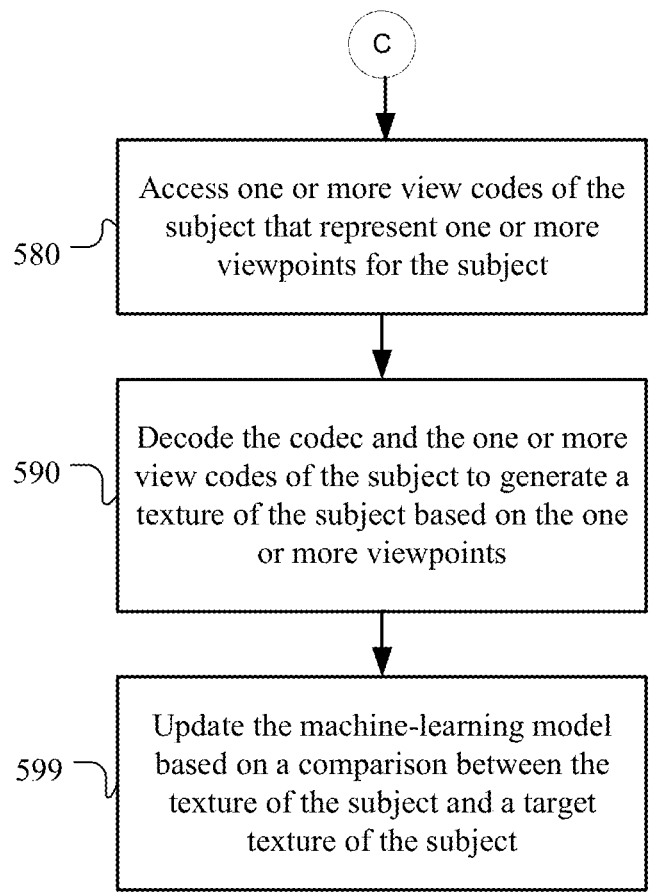

FIGS. 5A-5C illustrate an example method for rendering an avatar of a user with a pose, in accordance with certain embodiments. FIGS. 5A-5B illustrate a method for training a machine-learning model to generate an output geometry of a user, and FIG. 5C illustrates a method for training a machine-learning model to generate an output texture of a user. The trained machine-learning model may be implemented in the wearable device (e.g., a head-mounted display). The avatar rendered by the machine-learning model trained by the methods disclosed in FIGS. 5A-5C may be provided to or displayed on any computing system (e.g., an end user's device, such as a smartphone, virtual reality system, gaming system, etc.). FIG. 5A discloses a method 500 for generating a codec for training the machine-learning model. The method 500 may begin at step 510 with accessing a codec that encodes an appearance associated with a subject. The codec comprises codec portions that respectively correspond to body parts of the subject.

At step 520, the method 500 may select a first subset of the codec portions corresponding to a first subset of the body parts and a second subset of the codec portions corresponding to a second subset of the body parts.

At step 530, the method 500 may modify the second subset of the codec portions. In particular embodiments, modifying the second subset of the codec portions comprises replacing the second subset of the codec portions with the first subset of the codec portions. In particular embodiments, modifying the second subset of the codec portions comprises introducing noise to the second subset of the codec portions.

At step 540, the method 500 may generate a training codec that comprises the first subset of the codec portions and the modified second subset of the codec portions.

Furthermore, FIG. 5B discloses a method 501 for decoding the training codec to generate an output geometry to update the machine-learning model. The method 501 may begin, at step 550 follows the step 540 in the method 500, with decoding the training codec using a machine-learning model to generate a mesh of the subject. In particular embodiments, the machine-learning model may be configured to generate images for television monitors, cinema screens, computer monitors, mobile phones, or tablets.

At step 560, the method 501 may transform the mesh of the subject based on a predetermined pose. In particular embodiments, transforming the mesh of the subject based on the predetermined pose comprises applying a template mesh of the subject which includes appearance information of the subject to the mesh, and deforming the applied mesh based on the predetermined pose.

At step 570, the method 501 may update the machine-learning model based on a comparison between the transformed mesh (e.g., the output geometry) and a target mesh of the subject having the predetermined pose. In particular embodiments, the comparison may be generated by comparing the first subset of the body parts in the transformed mesh with corresponding body parts in the target mesh, generating a geometry $\hat{G}$ of the transformed mesh based on the comparison, and calculating a loss based on the geometry $\hat{G}$ and a geometry G of the corresponding body parts in the target mesh.

The methods 500, 501 of FIGS. 5A-5B may also be trained by a batch of codecs of the subject. In particular embodiments, the methods 500, 501 may further comprise accessing one or more batches of codecs of the subject, selecting a first set of the codecs corresponding to a third subset of the body parts and a second set of the codecs corresponding to a fourth subset of the body parts, copying the first set of the codecs to replace a corresponding set of the codecs in each batch of the one or more batches, generating a set of training codecs that comprises the first set of the codecs for the third subset of the body parts in each batch, decoding the set of the training codecs using the machine-learning model to generate a second mesh of the subject, transforming the second mesh of the subject based on a second predetermined pose, and updating the machine-learning model based on a second comparison between the transformed second mesh and a second target mesh of the subject having the second predetermined pose. Each codec has predetermined regions that map to different body parts of the subject. Furthermore, the second comparison may be generated by comparing the third subset of the body parts in the transformed second mesh with corresponding body parts in the second target mesh, generating a second geometry $\hat{G}$ of the transformed second mesh based on the comparison, and calculating a second loss based on the second geometry $\hat{G}$ and a geometry G of the corresponding the body parts in the second target mesh.

FIG. 5C discloses a method 502 for training a machine-learning model to generate the output texture of the user. The method 502 may begin, at step 580 follows the step 570 in the method 501, with accessing one or more view codes of the subject that represent one or more viewpoints for the subject.

At step 590, the method 502 may decode the codec and the one or more view codes of the subject to generate a texture of the subject based on the one or more viewpoints.

At step 599, the method 502 may update the machine-learning model based on a comparison between the texture of the subject and a target texture of the subject.

By the machine-learning model trained by the methods disclosed in FIGS. 5A-5C, the trained machine-learning model may render an avatar for the user with any pose corresponding to an input pose.

Particular embodiments may repeat one or more steps of the methods of FIGS. 5A-5C, where appropriate. Although this disclosure describes and illustrates particular steps of the methods of FIGS. 5A-5C as occurring in a particular order, this disclosure contemplates any suitable steps of the methods of FIGS. 5A-5C occurring in any suitable order. Moreover, although this disclosure describes and illustrates an example method for local localization including the particular steps of the methods of FIGS. 5A-5C, this disclosure contemplates any suitable method for local localization including any suitable steps, which may include all, some, or none of the steps of the methods of FIGS. 5A-5C, where appropriate. Furthermore, although this disclosure describes and illustrates particular components, devices, or systems carrying out particular steps of the methods of FIGS. 5A-5C, this disclosure contemplates any suitable combination of any suitable components, devices, or systems carrying out any suitable steps of the methods of FIGS. 5A-5C.

Figure 6:
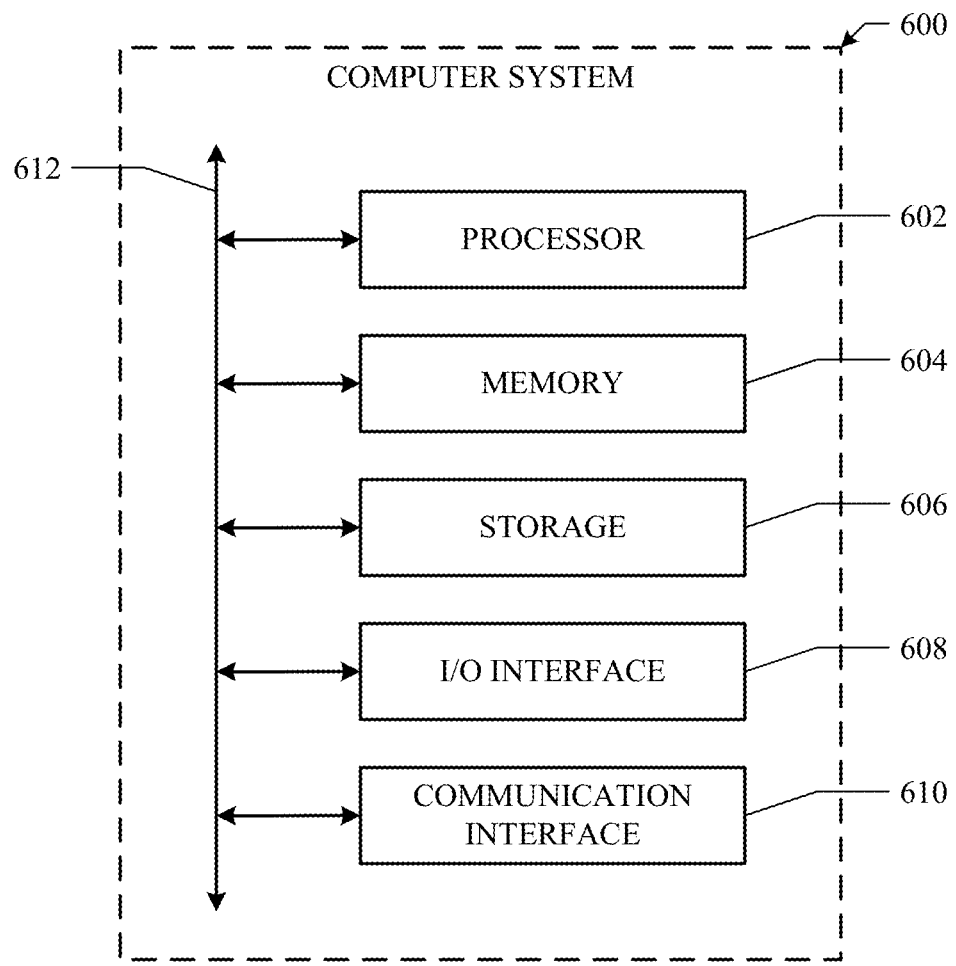
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate. [71] Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

According to various embodiments, an advantage of features herein is that a trained machine-learning model can generate an avatar of a user with any possible poses without excessive training data. The machine-learning model disclosed in the present application is trained by training codecs which select different codec portions corresponding to different body parts of the user respectively, so that the machine-learning model can recognize that each body part of the user is not correlated with each other. Therefore, the trained machine-learning model can generate an avatar for the user which comprises a pose corresponding to an input/predetermined pose based on uncorrelated codec portions in the codec of the user.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising, by a computing system:
    accessing a codec that encodes an appearance associated with a subject, wherein the codec comprises codec portions that respectively correspond to body parts of the subject;
    selecting a first subset of the codec portions corresponding to a first subset of the body parts and a second subset of the codec portions corresponding to a second subset of the body parts;
    modifying the second subset of the codec portions;
    generating a training codec that comprises the first subset of the codec portions and the modified second subset of the codec portions;
    decoding the training codec using a machine-learning model to generate a mesh of the subject;
    transforming the mesh of the subject based on a predetermined pose; and
    updating the machine-learning model based on a comparison between the transformed mesh and a target mesh of the subject having the predetermined pose.

2. The method of claim 1, wherein modifying the second subset of the codec portions comprises replacing the second subset of the codec portions with the first subset of the codec portions.

3. The method of claim 1, wherein modifying the second subset of the codec portions comprises introducing noise to the second subset of the codec portions.

4. The method of claim 1, wherein the comparison is generated by:
    comparing the first subset of the body parts in the transformed mesh with corresponding body parts in the target mesh;
    generating a geometry $\hat{G}$ of the transformed mesh based on the comparison; and calculating a loss based on the geometry $\hat{G}$ and a geometry G of the corresponding body parts in the target mesh.

5. The method of claim 1, wherein transforming the mesh of the subject based on the predetermined pose comprises:
applying a template mesh of the subject which includes appearance information of the subject to the mesh; and
deforming the applied mesh based on the predetermined pose.

6. The method of claim 1, further comprising:
accessing one or more view codes of the subject that represent one or more viewpoints for the subject;
decoding the codec and the one or more view codes of the subject to generate a texture of the subject based on the one or more viewpoints; and
updating the machine-learning model based on a comparison between the texture of the subject and a target texture of the subject.

7. The method of claim 1, further comprising:
accessing one or more batches of codecs of the subject;
selecting a first set of the codecs corresponding to a third subset of the body parts and a second set of the codecs corresponding to a fourth subset of the body parts;
copying the first set of the codecs to replace a corresponding set of the codecs in each batch of the one or more batches;
generating a set of training codecs that comprises the first set of the codecs for the third subset of the body parts in each batch;
decoding the set of the training codecs using the machine-learning model to generate a second mesh of the subject;
transforming the second mesh of the subject based on a second predetermined pose; and
updating the machine-learning model based on a second comparison between the transformed second mesh and a second target mesh of the subject having the second predetermined pose.

8. The method of claim 7, wherein each codec has predetermined regions that map to different body parts of the subject.

9. The method of claim 7, wherein the second comparison is generated by:
comparing the third subset of the body parts in the transformed second mesh with corresponding body parts in the second target mesh;
generating a second geometry $\hat{G}$ of the transformed second mesh based on the comparison; and
calculating a second loss based on the second geometry $\hat{G}$ and a geometry G of the corresponding the body parts in the second target mesh.

10. The method of claim 1, wherein the updated machine-learning model is further configured to generate images for television monitors, cinema screens, computer monitors, mobile phones, or tablets.

11. One or more computer-readable non-transitory storage media embodying software that is operable when executed to:
access a codec that encodes an appearance associated with a subject, wherein the codec comprises codec portions that respectively correspond to body parts of the subject;
select a first subset of the codec portions corresponding to a first subset of the body parts and a second subset of the codec portions corresponding to a second subset of the body parts;
modify the second subset of the codec portions;
generate a training codec that comprises the first subset of the codec portions and the modified second subset of the codec portions;
decode the training codec using a machine-learning model to generate a mesh of the subject;
transform the mesh of the subject based on a predetermined pose; and
update the machine-learning model based on a comparison between the transformed mesh and a target mesh of the subject having the predetermined pose.

12. The media of claim 11, wherein modifying the second subset of the codec portions comprises replacing the second subset of the codec portions with the first subset of the codec portions.

13. The media of claim 11, wherein modifying the second subset of the codec portions comprises introducing noise to the second subset of the codec portions.

14. The media of claim 11, wherein the comparison is generated by:
comparing the first subset of the body parts in the transformed mesh with corresponding body parts in the target mesh;
generating a geometry $\hat{G}$ of the transformed mesh based on the comparison; and
calculating a loss based on the geometry $\hat{G}$ and a geometry G of the corresponding body parts in the target mesh.

15. The media of claim 11, wherein transforming the mesh of the subject based on the predetermined pose comprises:
applying a template mesh of the subject which includes appearance information of the subject to the mesh; and
deforming the applied mesh based on the predetermined pose.

16. The media of claim 11, wherein the software is further operable when executed to:
access one or more view codes of the subject that represent one or more viewpoints for the subject;
decode the codec and the one or more view codes of the subject to generate a texture of the subject based on the one or more viewpoints; and
update the machine-learning model based on a comparison between the texture of the subject and a target texture of the subject.

17. The media of claim 11, wherein the software is further operable when executed to:
access one or more batches of codecs of the subject;
select a first set of the codecs corresponding to a third subset of the body parts and a second set of the codecs corresponding to a fourth subset of the body parts;
copy the first set of the codecs to replace a corresponding set of the codecs in each batch of the one or more batches;
generate a set of training codecs that comprises the first set of the codecs for the third subset of the body parts in each batch;
decode the set of the training codecs using the machine-learning model to generate a second mesh of the subject;
transform the second mesh of the subject based on a second predetermined pose; and
update the machine-learning model based on a second comparison between the transformed second mesh and a second target mesh of the subject having the second predetermined pose.

18. The media of claim 17, wherein each codec has predetermined regions that map to different body parts of the subject.

19. The media of claim 17, wherein the second comparison is generated by:
   comparing the third subset of the body parts in the transformed second mesh with corresponding body parts in the second target mesh;
   generating a second geometry $\hat{G}$ of the transformed second mesh based on the comparison; and
   calculating a second loss based on the second geometry $\hat{G}$ and a geometry G of the corresponding the body parts in the second target mesh.

20. A system comprising: one or more processors; and one or more computer-readable non-transitory storage media coupled to one or more of the processors and comprising instructions operable when executed by one or more of the processors to cause the system to:
   access a codec that encodes an appearance associated with a subject, wherein the codec comprises codec portions that respectively correspond to body parts of the subject;
   select a first subset of the codec portions corresponding to a first subset of the body parts and a second subset of the codec portions corresponding to a second subset of the body parts;
   modify the second subset of the codec portions;
   generate a training codec that comprises the first subset of the codec portions and the modified second subset of the codec portions;
   decode the training codec using a machine-learning model to generate a mesh of the subject;
   transform the mesh of the subject based on a predetermined pose; and
   update the machine-learning model based on a comparison between the transformed mesh and a target mesh of the subject having the predetermined pose.

* * * * *